3,119,741
NON-SPECIFIC IMMUNIZING AGENT
Henry H. Freedman, Princeton, and Barnet M. Sultzer, Lawrence, N.J., assignors to Princeton Laboratories, Inc., Princeton, N.J., a corporation of New Jersey
No Drawing. Filed Apr. 10, 1962, Ser. No. 186,307
4 Claims. (Cl. 167—78)

This invention relates to novel immunizing agents, their preparation and compositions containing the same. More particularly, the present invention relates to immunizing compositions derived from microbial endotoxins which are capable of inducing non-specific immunities.

Bacterial derivatives have been proposed heretofore for use in stimulating secretion of adrenocorticotropic hormone (ACTH) by the pituitary gland which, in turn, effects stimulation and secretion of cortical steroids from the cortex of the adrenal glands. These objectives have also been known as "non-specific therapy" and have been substantially obviated due to the toxicity and untoward side effects inherent therein and due, also, and concomitantly, to the development of direct, well-controlled therapy employing highly purified ACTH and synthetic steroid compounds.

It is noted that the term "non-specific" as employed herein presumes a significance, entirely valid, but completely disparate from that referred to above. The unrelated usage of the term as employed herein is intended rather to indicate the protection afforded by a microbial derivative against heterologous microorganisms, that is, microorganisms not directly related immunologically to the bacteria from which the endotoxin is obtained, and thus distinguishes from specific immunity obtained by giving a specific antigen for the homologous infection, i.e., a vaccine. The basis for non-specific immunization and protection against infection is not definitely known, but appears to be related to stimulation of the reticuloendothelial system. It is noted in this regard that the compositions of the present invention may be shown to induce significant stimulation of this system.

Acetylated derivatives of bacterial vaccines have been suggested heretofore for employment as specific vaccines but not for non-specific immunization as described herein. Such vaccines have been taught for use simply after acetylation and without fractionation to isolate the immunologically potent fraction thereof; a technique wherein, even if acetylation, such as described with relation thereto, were effective with a particular proportion of acetylated composition, would not appear to significantly reduce or eliminate the pyrogenicity or toxicity of the total mixture employed.

It is among the objects of the present invention to provide a bacterial derivative suitable for use for non-specific immunization, and a process for preparing such a derivative in high yield in a simple and efficient manner.

A further object of the invention is to provide compositions containing such derivative and known antibiotic materials.

Other objects and advantages of the invention will be apparent from the following detailed description thereof.

In accordance with the invention a non-specific substantially non-toxic immunogenic composition is provided, comprising a partially acylated bacterial lipopolysaccharide endotoxin extract, which acylated endotoxin is lyophobic and is water and chloroform insoluble, the carbohydrate content being incompletely acylated. The extract of this invention, in which a protein component may be present, is valuable as a non-specific immunological agent and in admixture with antibiotic agents, producing therapeutic mixtures having decreased toxicities.

Inasmuch as the endotoxin extract enhances non-specific host resistance its admixture with antimicrobial therapeutic agents such as antibiotics, e.g., penicillin, streptomycin or sulfonamide may be expected to allow use of lower doses of the antimicrobial agent in achieving therapeutic usefulness with less likelihood of toxicity for the antimicrobial therapeutic agent. While endotoxins have previously been suggested as adjuncts to antibiotic therapy, the side effects due to their use have prevented their wide adoption. Moreover, administration of known native endotoxins produces a temporary increased susceptibility to infection, thereby increasing the dangers of their use for infectious conditions. In sharp contrast thereto, the acylated endotoxin extracts of this invention do not produce untoward side effects and, when admixed with antibiotics, would provide an unexpected synergism permitting the use of lower effective antibiotic doses, thereby minimizing antibiotic toxicities, which depend on dose, and facilitating the use of low doses of relatively toxic antibiotics which are too toxic for use at ordinary doses, frequently producing auditory nerve damage, bone-marrow damage or the like.

The substantially non-toxic acylated endotoxin extract, which is valuable as a non-specific immunological agent in accordance with this invention, is prepared by a method which involves in brief, extraction of endotoxin from a microbial culture of a gram-positive, gram-negative, or acid-fast microorganism with sequential acylation, and preferably acetylation, in a substantially anhydrous medium with an acyl derivative and fractionation of the resulting mixture at an elevated temperature, i.e., 80° C. to 120° C. A precipitate is caused to be deposited from the resulting cooled reaction mixture by centrifugation and the precipitate is separated therefrom. The precipitate is then treated with a pyrogen-free saline solution and the mixture centrifuged, or separated by settling or other known methods. A packed precipitate remains at the conclusion of this step and a fine suspension. The latter is removed. After succesive washings of the precipitate with sterile, pyrogen-free water, the resulting product is dried to yield the composition of the present invention which is designated herein, for convenience, as Fraction P.

The acylation of the endotoxin is carried out to partially acylate the carbohydrate content thereof, such that the extract is lyophobic, i.e., neither forms an opalescent solution in water nor is converted to a totally acylated chloroform-soluble derivative. It will be understood the degree of acylation is dependent on the percentage of carbohydrate present in the original endotoxin to be acylated, those preparations having higher nitrogen content also having less carbohydrate.

The precipitate formed in the initial centrifugation step is normally dried to effect complete freedom of the precipitate from unreacted acyl agent and returned as a ground powder for further centrifugation with the pyrogen-free saline solution. The various drying phases which the precipitates of the instant process undergo take place at ambient temperature under a nitrogen stream.

Preparation of the endotoxin as well as the sequential fractionation are, of course, performed in sterile pyrogen-free physiological saline solutions. The equipment employed in this procedure is rendered pyrogen-free by baking at 175° C. to 180° C. for a period of about two hours.

The endotoxins employed herein are extracted from a variety of gram-positive, gram-negative and acid-fast organisms by a variety of standard techniques, the resulting extracts evidencing similar biological potency, which will, however, vary with the degree of purification effected. These endotoxins, suitable for use in producing the acylated compositions of the invention, are estimated to have a molecular weight of one million to ten million and appear to be composed of lipid, carbohydrate and protein; the latter component being substantially reduced and eliminated in those instances where purification is greatest. Some nitrogen, e.g., up to 6 percent by weight, is, however, normally apparent in the resulting endotoxin, indicating the presence of at least trace amounts of protein in addition to amine sugars. Extraction of the endotoxin is generally effected by means of trichloroacetic acid or phenol-water solutions; procedures well known in the art and described, for example, by Westphal et al., "Zeitschrift für Naturforschung," vol. 7b, page 148 (1952); Burger, "Bacterial Polysaccharides," pages 231, 243, 244, 248, 251 et seq. (1950); Westphal, "Die Chemie," vol. 57, pages 57 and 61 (1944); and Boivin, A., and L. Mesrobeanu (1935), Rev. d'Immunol. 1, 553–569.

Suitable endotoxins for acylation and production of the aforesaid Fraction P by the procedure herein described are extracted from such gram-negative bacteria as *Salmonella typhosa, Salmonella paratyphi, Salmonella enteritides, Salmonella abortus equi, Escherichia coli, Pseudomonas aeruginosa, Serratia marcescens, Brucella abortus, Shigella dysenteriae, Hemophilus pertussis*.

Suitable gram-positive bacteria would include staphylococci such as *Staphylococcus aureus* and *Streptococcus* species. Moreover, suitable extracts endotoxic in nature may be derived from acid-fast organisms such as *Mycobacterium tuberculosis* (BCG).

The acylation of the endotoxins extracted from these various microorganisms may be carried out within the purview of the present invention with acyl halides, e.g., acetyl chloride or benzoyl chloride, or with acyl anhydries such as, for example, the anhydrides of butyric acid, propionic acid, and preferably acetic anhydride, that is anhydrides of saturated monocarboxylic acids wherein each of the acyl moieties contains from 2 to 4 carbon atoms. A particularly efficacious method of accomplishing acylation involves the use of acetic acid anhydrides and sodium acetate.

It is noted that the acylated non-specific immunizing composition of the invention, referred to as the Fraction P, while substantially free of the toxic manifestations induced by the endotoxin substrates per se, evidences non-specific immunization substantially equivalent to that of the original endotoxin in many instances. It is significant to note in this regard that the detoxification of Fraction P is reversible. Thus de-acylation of Fraction P by means of an alkali metal base such as sodium hydroxide (i.e., 0.01 N NaOH, 50° C., 30 minutes) results in return of full pyrogenicity and lethality to the endotoxin substrate. Moreover the excessive acylation of Fraction P causes activity to disappar. Upon de-acylation, there is a return of non-specific protection before a return of toxicity.

As is evident from the description appearing hereinabove several fractions containing modified and partially modified endotoxin are removed from the acylated reaction mixture in the course of the instant process. Thus, after the initial mixture of endotoxin and acylating agent is reacted at an elevated temperature within the range of 80° C. to 120° C. and preferably at about 100° C.; and the resulting mixture centrifuged, a Fraction L is obtained from the resulting solution which contains excess and unreacted acylating agent, for example acetic anhydride. This solution is evaporated with gentle heating to yield the aforesaid Fraction L which is a dry solid.

The precipitate formed and remaining after centrifugation and removal of the solution containing free acyl halide or anhydride and after being ground is centrifuged in a pyrogen-free saline solution as described elsewhere herein to yield a fine suspension and a heavy packed precipitate. The suspension is joined with successive washes of sterile pyrogen-free water with which the heavy precipitate is previously treated and the combined saline solution and suspension and water washes dialyzed at depressed temperatures, e.g., 4° C., with successive changes of sterile pyrogen-free water to remove sodium chloride. The dialyzed suspension is then lyophilized to recover the solids of a second fraction designated as Fraction E.

The packed precipitate is dried under a stream of nitrogen to provide Fraction P, as described above.

Of these fractions, the initial fraction, Fraction E, retains the toxicity of the original endotoxin, while Fractions L and P are essentially non-toxic. Fraction E can be used as substrate, more of Fraction P being recoverable therefrom by further acylation.

Fraction L is, however, substantially unprotective for the purposes alluded to with regard to Fraction P. Fraction P is thus substantially non-pyrogenic and non-toxic while retaining an equivalent non-specific immunogenic activity to that of the original endotoxin.

The following examples further illustrate, without being limiting of, the present invention.

EXAMPLE 1

An endotoxin of high potency and containing 6 percent nitrogen was prepared by a standard extraction procedure from *Salmonella typhosa* (ATCC 10749) using trichloroacetic acid. The minimum pyrogenic dose of this endotoxin is about $1/1000$ microgram; the $LD_{50}$ for the mouse being about 0.25 mg. It is, in addition, protective against infection at microgram dosages. One hundred mg. of the aforesaid endotoxin is placed into a sterile pyrogen-free 40 ml. conical centrifuge tube. Twenty-five milliliters of acetic anhydride (ACS quality) and 10 mg. of anhydrous sodium acetate are added. The reaction mixture is then heated in a boiling water bath for two hours. The centrifuge tube and contents are then cooled and centrifuged. The clear acetic anhydride solution is then transferred to a sterile flask and the solvent evaporated under nitrogen with gentle heating at 30° C. to 35° C. The dry solids recovered are designated as Fraction L.

The brownish precipitate remaining in the centrifuge tube, after the removal of the fraction containing unreacted acetic anhydride and Fraction L, is dried under a stream of nitrogen at room temperature to remove any residual traces of anhydride. After drying, the solids are ground to a fine powder in a sterile mortar, returned to the centrifuge tube, and 20 ml. of a sterile pyrogen-free saline solution (0.85% NaCl) is added. The solids are suspended in the saline solution; the suspension centrifuged at low speed, yielding a packed precipitate and a fine silky suspension of solids in the saline solution. The saline solution, containing the easily suspended fraction, is removed. The washing of the precipitate is repeated twice and a final wash with sterile pyrogen-free water is carried out. The washes are combined, dialyzed at a temperature of about 4° C. against three changes of 30 volumes of sterile pyrogen-free water to remove the sodium chloride of the original saline solution, and the dialyzed suspension is lyophilized to recover the solids. This is Fraction E.

The saline- and water-washed heavy precipitate is again dried under nitrogen at room temperature, and ground to a fine powder in a sterile mortar. This is Fraction P, the non-specific immunizing agent of the invention.

Fraction L, recovered from the solution initially removed from the centrifuge, dissolves completely in a 2:1 chloroform-methanol solution, and is transferred in this solvent to a weighed vial. The solvent is evaporated under nitrogen at room temperature and the vial is reweighed. The solid Fraction E obtained after lyophilization, and the nitrogen-dried Fraction P are also weighed. As indicated, the original endotoxin and the various fractions are prepared with sterile precautions as suspensions in sterile, pyrogen-free physiological saline solutions. All apparatus employed in direct contact with these compositions are rendered pyrogen-free by baking at 175° C. to 180° C. for a period of two hours. The yields are: Fraction L, 31 mg.; Fraction E, 22 mg.; and Fraction P, 45 mg.; for a total yield of 98 mg.

An analysis of these fractions yields the data appearing in Table I.

Table I

| Fraction | Analysis | |
|---|---|---|
| | Hexose [1] | Acetyl [2] |
| Original Endotxin | 32 | 1.6 |
| Fraction L | 18 | 7.0 |
| Fraction E | 35 | 3.2 |
| Fraction P | 29 | 12.0 |

[1] Anthrone method, calculated as one part glucose to one part galactose on a percent basis.
[2] Determined by saponification with .02 N NaOH at 55° C. for 30 minutes and titration to phenol red and-point with .01 N HCl.

The relative toxicity of unreacted endotoxin of the type employed in the example as well as the fractions obtained after acetylation has been studied in tests in which the aforesaid substances were administered intraperitoneally to mice. Fraction E evidenced a toxicity equivalent to that of the original endotoxin. Fractions L and P, on the other hand, demonstrated a substantial freedom from toxicity. The results of these tests are indicated in the following Table II.

Table II

| Toxicity in mice | Dead/Total | Percent Dead |
|---|---|---|
| Entotoxin, 0.3 mg | 13/20 | 65 |
| Endotoxin, 0.6 mg | 17/24 | 71 |
| Endotoxin, 0.9 mg | 10/10 | 100 |
| Fraction L, 0.6 mg | 0/15 | 0 |
| Fraction E, 0.3 mg | 6/10 | 60 |
| Fraction E, 0.6 mg | 10/10 | 100 |
| Fraction P, 0.6 mg | 0/9 | 0 |
| Fraction P, 0.9 mg | 0/10 | 0 |

The degree of pyrogenicity inherent in the original endotoxin and the recovered fractions has been tested in rabbits using 2–2.5 kg. male rabbits of mixed breed. In these latter tests the endotoxin and individual fractions were administered intravenously and the rectal temperatures of the treated animals taken every half-hour thereafter for a period of five hours. As evidenced by these tests, Fraction E demonstrated a high degree of pyrogenicity, producing febrile responses equal to that of the original endotoxin at like dosage levels. Fraction L evidenced substantial freedom from pyrogenicity at a dosage ten thousand times the minimum pyrogenic dosage of original endotoxin. Fraction P, in turn, demonstrated a significant elimination of pyrogenic effects as measured by a residual pyrogenicity of not more than one one-thousandth (1/1000) that of the original endotoxin.

Investigations have also been conducted with the original endotoxin of the example and Fractions P, L and E of the invention; isotonic non-pyrogenic saline solutions being administered to control animals, to test the non-specific protection afforded by these substances. These tests were undertaken with ICR mice (Bellewood) weighing 16–18 gm. injected intraperitoneally with the aforesaid substances twenty-four hours prior to challenge by an infecting organism administered in the same manner. The mortality rate among the test and control animals was determined at various intervals depending on the type of infection employed. These tests, as indicated by the data of the accompanying Table III, demonstrate the Fraction P provides at least equivalent protection of the original endotoxin at the same dosage levels to *Escherichia coli* and *Pseudomonas aeruginosa*.

Table III

| Infecting Organism | Fraction | Dose, μg. | Dead/Total [1] | Percent Dead |
|---|---|---|---|---|
| Ps. aeruginosa | Saline [2] | | 10/10 | 100 |
| | Endotoxin | 10 | 4/10 | 40 |
| | Fraction P | 10 | 3/10 | 30 |
| E. coli | Saline [1] | | 10/10 | 100 |
| | Endotoxin | 10 | 5/10 | 50 |
| | Fraction P | 10 | 2/10 | 20 |

[1] Observed three days after challenge.
[2] Control.

Survival time was studied in mice treated intraperitoneally in the manner described immediately above with the Fractions L, E, P, original endotoxin and non-pyrogenic physiological saline solutions and subsequently challenged with lethal dosages of *Salmonella typhimurium*. The results of these tests are shown in Table IV.

Table IV

INFECTING ORGANISM—S. TYPHIMURIUM

| Fraction | Dose, μg. | Dead/Total—Days | | | | | | |
|---|---|---|---|---|---|---|---|---|
| | | 1 | 2 | 3 | 4 | 5 | 6 | 7 |
| Saline | | 0/10 | 0/10 | 5/10 | 9/10 | 10/10 | | |
| L | 10 | 0/10 | 1/10 | 4/10 | 6/10 | 8/10 | 10/10 | |
| E | 10 | 0/10 | 0/10 | 0/10 | 1/10 | 1/10 | 2/10 | 5/10 |
| P | 10 | 0/10 | 0/10 | 0/10 | 1/10 | 2/10 | 3/10 | 4/10 |
| Endotoxin | 10 | 0/10 | 0/10 | 1/10 | 2/10 | 3/10 | 6/10 | 6/10 |

Table V

INFECTING ORGANISM—STAPH. AUREUS (SMITH)

| Fraction | Dose, μg. | Dead/Total (48 hours) |
|---|---|---|
| Saline | | 5/10 |
| Endotoxin | 10 | 0/10 |
| Do | 50 | 0/10 |
| P | 10 | 0/10 |
| P | 50 | 0/10 |

In the above tests, the infecting organisms were grown in brain heart infusion broth (Difco) for 18 hours at 35° C. and, prior to injection, were appropriately diluted in sterile broth according to standard procedures. The *E. coli* inoculum consisted of approximately $2 \times 10^8$ viable cells per ml. while the *Ps. aeruginosa* viable count amounted to about $6 \times 10^8$ cells per ml. The count with *S. typhimurium* (Table IV) was about $13 \times 10^8$ viable cells/ml. and with *Staph. aureus* (Table V) $14 \times 10^9$ viable cells/ml. Dosages in each instance were 0.25 ml. intraperitoneally (I.P.) except with *Staph. aureus* where it was 0.1 ml. I.P.

These tests demonstrated that the degree of protection afforded by the Fractions P and E was substantially equivalent to that conferred by the original endotoxin.

Further tests have indicated that the initial brief increased susceptibility to infection which occurs after administration of native endotoxins is not produced by the endotoxin extract prepared in accordance with Example 1. Hence in one series of tests, mice were given a non-lethal dosage of *Staphylococcus aureus* preceded by the treatments indicated in Table VI below; the percentage survival after each test is indicated in Table VI.

Table VI

INFECTING ORGANISM—STAPH. AUREUS

| Fraction | Dose μgm. | Time Delay | Percent Dead |
|---|---|---|---|
| Saline | | 30 Minutes before infection. | 0 |
| Endotoxin | 1 | do | 50 |
| Do | 10 | do | 67 |
| Acetylated Endotoxin | 1 | do | 0 |
| Do | 10 | do | 0 |

This test demonstrates that the acetylated endotoxin extracts of this invention do not possess the characteristic initial susceptibility-enhancing effect of native endotoxins; this indicates that such materials can be safely admixed with antibiotics, whereas the native endotoxins cannot safely be so employed.

EXAMPLE 2

100 milligrams of the endotoxin, extracted as described in Example 1, were added to 10 milliliters pyridine in a sterile pyrogen-free centrifuge tube. 0.5 milliliter of benzoyl chloride was added dropwise to the mixture while maintaining it at 0° C. with agitation, throughout a one-half hour period. The reaction mixture was then centrifuged, the precipitate dried, washed and treated in the manner described in Example 1.

The product, the benzoylated endotoxin extract, was detoxified and produced the same results referred to above, in relation to the acetylated extract.

Stimulation of the reticuloendothelial system is believed increasingly to be the basis for non-specific immunization and resistance to infection since this system removes and detoxifies bacteria in the body of the subject. This stimulation is measured by determining the rate of clearance of carbon particles injected into the blood stream of the subject. The result of such stimulation is a greater rate of clearance from the blood, such as is capable of being induced normally by endotoxins of gram-positive and gram-negative bacteria, such as that employed in the examples appearing hereinabove.

Accordingly, the stimulatory ability of the immunogenic composition of the invention, Fraction P, has been tested in mice injected intraperitoneally. In these tests control animals were injected with pyrogen-free physiological saline solution; each of a second set of control animals was given 10 micrograms of the original endotoxin of Example 1; and a group of test animals were each given 10 micrograms of Fraction P of Example 1. After twenty-four hours, the period of challenge with pathogenic bacteria in this test procedure, carbon clearance rates were determined for each mouse in each group. The mean half-time ($t\frac{1}{2}$) for clearance in each group was as follows: (1) controls, saline: 12.5 minutes; (2) controls, endotoxin: 7.5 minutes; and (3) Test animals, Fraction P, 6.5 minutes. Thus, Fraction P causes at least as great, and indeed a more rapid, stimulation of the reticuloendothelial system compared to the original endotoxin.

In brief then, the immunological fraction of acylated endotoxin designated as Fraction P herein has demonstrated a non-specific protective activity in mammals against bacterial infection which is equivalent to that of the highly potent endotoxins from which it is derived while at the same time evidencing a substantial freedom from pyrogenic and other toxic and untoward side effects.

In the foregoing, the invention has been described only in connection with preferred embodiments thereof. Many variations and modifications of the principles of the invention within the scope of the description herein are obvious. Accordingly, it is preferred to be bound not by the specific disclosure herein, but only by the appending claims.

This application is a continuation-in-part of co-pending application Serial No. 108,253, filed May 8, 1961.

The embodiments of the invention in which an exclusive privilege or property is claimed are defined as follows.

We claim:

1. In a process of preparing an immunogenic composition adapted for use in stimulating non-specific immunity, the steps comprising incompletely acylating, at elevated temperatures under substantially anhydrous conditions, a pyrogenic endotoxin extracted from a known endotoxin-producing source microorganism, with a non-ketenic acylating agent, causing a precipitate to be deposited from the resulting reaction mixture, washing said precipitate in a pyrogen-free aqueous medium and recovering a non-specific substantially non-toxic immunogenic composition as the residual precipitate.

2. The process of claim 1 in which the acylating agent is acetic anhydride and the acylation temperature is in the range of 80° C. to 120° C.

3. A non-specific substantially non-toxic immunogenic composition, comprising an incompletely acylated bacterial lipopolysaccharide endotoxin extract made in accordance with the method of claim 1.

4. The process of stimulating non-specific immunity in susceptible host mammals which comprises administering a non-specific substantially non-toxic immunogenic composition, comprising a partially acylated bacterial lipopolysaccharide endotoxin extract made in accordance with the method of claim 1.

References Cited in the file of this patent

Foster: J. Bact., October 1957, vol. 74:4, 514–524.

Huddleson: "Brucellosis in Man and Animals," N.Y., 1943, pages 146–151, 245–246.

Kabat et al.: Experimental Immunochemistry, 1948, Charles J. Thomas, Springfield, Illinois, pp. 441–446.

Ezell et al.: P.S.E.B.M., vol. 80, No. 2, 1952, pp. 220–223.

Schneider: I.J. Inf. Diseases, vol. 94:3, pages 297–305, p. 303, May-June 1954.

Hoag et al.: Am. Jour. Vet. Res., vol. 16, No. 60, pages 381–385, July 1955.

Foster: J. Bact., October 1957, vol. 74:4, 514–524.

Miles et al.: Brit. J. Exptl. Path., 1939, vol. 20 pp. 278–296.

Schneider: Experimental Pathology, vol. 4, No. 2, pages 107–116, March 1955.

Schneider: Am. J. Vet. Res., vol. 16, No. 58, pages 173–179, January 1955.